United States Patent
Wang et al.

(10) Patent No.: US 10,503,952 B2
(45) Date of Patent: Dec. 10, 2019

(54) FINGERPRINT IDENTIFICATION DISPLAY DEVICE

(71) Applicant: BOE TECHNOLOGY GROUP CO., LTD., Beijing (CN)

(72) Inventors: Haisheng Wang, Beijing (CN); Xue Dong, Beijing (CN); Jing Lv, Beijing (CN); Chun Wei Wu, Beijing (CN); Yingming Liu, Beijing (CN); Xiaoliang Ding, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 52 days.

(21) Appl. No.: 15/743,130

(22) PCT Filed: Jul. 19, 2017

(86) PCT No.: PCT/CN2017/093489
§ 371 (c)(1),
(2) Date: Jan. 9, 2018

(87) PCT Pub. No.: WO2018/024099
PCT Pub. Date: Feb. 8, 2018

(65) Prior Publication Data
US 2019/0102593 A1    Apr. 4, 2019

(30) Foreign Application Priority Data
Aug. 2, 2016 (CN) .......................... 2016 1 0626184

(51) Int. Cl.
*G06K 9/00* (2006.01)
*G06F 3/041* (2006.01)
*G06F 3/042* (2006.01)

(52) U.S. Cl.
CPC ......... *G06K 9/0004* (2013.01); *G06F 3/0412* (2013.01); *G06F 3/0421* (2013.01); *G06K 9/00* (2013.01)

(58) Field of Classification Search
CPC .. G06K 9/0004; G06K 9/0002; G06F 3/0412; G06F 3/044; G06F 21/32
(Continued)

(56) References Cited

U.S. PATENT DOCUMENTS 8,570,303 B2 * 10/2013 Chen .................... G06K 9/0004
345/175
9,733,418 B2 * 8/2017 Shih ..................... G02B 6/0068
(Continued)

FOREIGN PATENT DOCUMENTS

| CN | 105094460 A | 11/2015 |
| CN | 105184248 A | 12/2015 |

(Continued)

OTHER PUBLICATIONS

International Search Report dated Sep. 27, 2017.

*Primary Examiner* — Charlotte M Baker
(74) *Attorney, Agent, or Firm* — Dilworth & Barrese, LLP.; Michael J. Musella, Esq.

(57) ABSTRACT

A fingerprint identification display device includes: a display panel; a light guide plate arranged on a light emitting surface of the display panel; a light emitting component configured to emit modulated light; and a plurality of photosensitive induction units arranged in an array and arranged below the light guide plate, in which the modulated light is transmitted between the light guide plate and the display panel in a total reflection mode.

20 Claims, 2 Drawing Sheets

(58) Field of Classification Search
USPC .................. 382/124; 250/208.1; 345/175
See application file for complete search history.

(56) References Cited

U.S. PATENT DOCUMENTS

| | | | |
|---|---|---|---|
| 2014/0205160 A1* | 7/2014 | Chang | G06K 9/0004 |
| | | | 382/124 |
| 2016/0216844 A1 | 7/2016 | Bergstrom | |
| 2016/0349879 A1 | 12/2016 | Wang et al. | |
| 2017/0262686 A1 | 9/2017 | Gao et al. | |
| 2017/0270340 A1 | 9/2017 | Gao et al. | |

FOREIGN PATENT DOCUMENTS

| | | |
|---|---|---|
| CN | 105184282 A | 12/2015 |
| CN | 105678255 A | 6/2016 |
| CN | 105808021 A | 7/2016 |
| CN | 106228144 A | 12/2016 |
| CN | 206058222 U | 3/2017 |
| WO | 2015140238 A1 | 9/2015 |

\* cited by examiner

FINGERPRINT IDENTIFICATION DISPLAY DEVICE

TECHNICAL FIELD

The present disclosure relates to a fingerprint identification display device.

BACKGROUND

With a rapid development of display technology, a display panel with a fingerprint recognition function has gradually spread throughout people's life. At present, the display panel with the fingerprint recognition function usually adopts a capacitive structure to realize the function of fingerprint identification. For example, an embedded fingerprint identification display panel is a display panel that a capacitive fingerprint identification component is disposed in the display panel, which is beneficial to a light thinning design of the display panel, however, the capacitive fingerprint identification component is easy to produce a parasitic capacitance with other components of the display panel, therefore, a fingerprint recognition detection signal and a display signal are interfered with each other, thus an accuracy of fingerprint recognition is reduced.

SUMMARY

At least one embodiment of the present disclosure provides a fingerprint identification display device, and the fingerprint identification display device comprises: a display panel; a light guide plate arranged on a light emitting surface of the display panel; a light emitting component configured to emit modulated light; and a plurality of photosensitive induction units arranged in an array and arranged below the light guide plate, wherein the modulated light is transmitted between the light guide plate and the display panel in a total reflection mode.

For example, in the fingerprint identification display device provided by at least one embodiment of the present disclosure, each of the photosensitive induction unit comprises a photosensitive diode and a control switching transistor, the photosensitive diode is configured to sense the modulated light reflected by a ridge of a fingerprint, and the control switching transistor is configured to control the photosensitive diode to convert the modulated light into a potential and output the potential.

For example, the fingerprint identification display device provided by at least one embodiment of the present disclosure, further comprises: identification scanning lines and recognition output lines, wherein the identification scanning lines are configured to load identification scanning signals to the control switching transistor, and the recognition output lines are configured to load a negative bias to the photosensitive diode by the control switching transistor, or the recognition output lines are configured to read electrical signals output by the photosensitive diode.

For example, in the fingerprint identification display device provided by at least one embodiment of the present disclosure, each of the identification scanning lines corresponds to each row of the photosensitive induction units in a one-to-one manner, each of the recognition output lines corresponds to each column of the photosensitive induction units in a one-to-one manner; or each of the identification scanning lines corresponds to each column of the photosensitive induction units in a one-to-one manner, and each of the recognition output lines corresponds to each row of the photosensitive induction units in a one-to-one manner.

For example, in the fingerprint identification display device provided by at least one embodiment of the present disclosure, each of the photosensitive induction units, each of the identification scanning lines and each of the recognition output lines are arranged in the display panel.

For example, in the fingerprint identification display device provided by at least one embodiment of the present disclosure, each of the photosensitive induction units, each of the identification scanning lines and each of the recognition output lines are arranged in a region covered by a black matrix in the display panel.

For example, in the fingerprint identification display device provided by at least one embodiment of the present disclosure, each of the photosensitive induction units, each of the identification scanning lines and each of the recognition output lines are arranged on a surface of the light guide plate close to the display panel.

For example, the fingerprint identification display device provided by at least one embodiment of the present disclosure, may further comprise a transparent reflection film, wherein the transparent reflection film is disposed on the surface of the light guide plate close to the display panel and arranged between the light guide plate and each of the photosensitive induction units, and a refractive index of the transparent reflection film is smaller than a refractive index of the light guide plate.

For example, in the fingerprint identification display device provided by at least one embodiment of the present disclosure, the transparent reflection film is made of inorganic material.

For example, in the fingerprint identification display device provided by at least one embodiment of the present disclosure, the light guide plate is a protective cover plate which is arranged above the display panel.

For example, in the fingerprint identification display device provided by at least one embodiment of the present disclosure, the protective cover plate has a groove structure at its frame facing to a side of the display panel, and the light emitting component is in the groove structure.

For example, the fingerprint identification display device provided by at least one embodiment of the present disclosure, further comprises: a protective cover plate arranged on the display panel, wherein the light guide plate is arranged between the display panel and the protective cover plate.

For example, in the fingerprint identification display device provided by at least one embodiment of the present disclosure, the light emitting component is arranged at at least two sides of the light guide plate opposite to each other.

For example, the fingerprint identification display device provided by at least one embodiment of the present disclosure, further comprises: a blocking component arranged on the light emitting component, wherein a positive projection of the blocking component on the display panel covers at least a portion of a positive projection of the light emitting component.

For example, in the fingerprint identification display device provided by at least one embodiment of the present disclosure, the positive projection of the blocking component on the display panel covers a whole positive projection of the light emitting component.

For example, in the fingerprint identification display device provided by at least one embodiment of the present disclosure, the light emitting component is an OLED light source or a LED light source for emitting modulated infrared light or modulated visible light.

BRIEF DESCRIPTION OF THE DRAWINGS

In order to clearly illustrate the technical solution of the embodiments of the disclosure, the drawings of the embodiments will be briefly described in the following, it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the words, such as "comprise/comprising", "include/including", etc., mean the components or objects that appear in front of the words to cover the similar components or objects that are listed in the following of the words, but other different components or objects are not excluded. The phrases "connect", "connected", etc., are not limited to a physical connection or mechanical connection, but may include an electrical connection, directly or indirectly. The terms "up", "down", "left", "right", etc., are used to indicate the relative position relation, when the absolute position of the described object is changed, the relative position relation may also be changed accordingly.

It should be noted that, a shape and a size of each of the components of the fingerprint recognition display devices do not represent an actual proportion of each of the fingerprint recognition display devices, and the purpose is just schematically indicate the content of the present disclosure.

Figure 1:
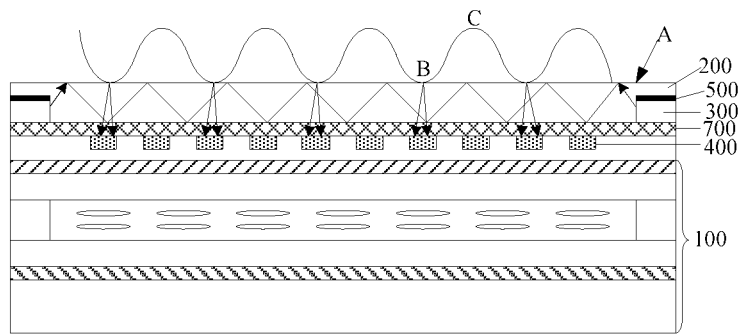
FIG. 1 is a schematic diagram of a structure of a fingerprint identification display device provided by an embodiment of the present disclosure.

An embodiment of the present disclosure provides a fingerprint identification display device, as illustrated in FIG. 1, the fingerprint identification display device comprises: a display panel 100; a light guide plate 200 arranged on a light emitting surface of the display panel 100; a light emitting component 300 configured to emit modulated light, the modulated light is transmitted between the light guide plate 200 and a display surface A of the display device in a total reflection mode; and a plurality of photosensitive induction units arranged in an array and arranged below the light guide plate.

It should be noted that, in the fingerprint identification display device provided by an embodiment of the present disclosure, the display surface A refers to an outermost surface of the display device facing the user, or a surface capable of being touched by the user's finger. Moreover, in the embodiment of the present disclosure, the type of display panel 100 is not limited, and the display panel 100 can be a liquid crystal display panel, or an electroluminescent display panel and other flat panel display panels.

It should be noted that, the "modulated light" in the embodiment of the present disclosure, for example, refers to the light alternated between bright and dark, in this way, it is capable of sampling in a bright state and a dark state respectively. After sampling in a bright state and a dark state, the effect of ambient light is removed by a differential treatment. For example, the modulated light is light that at least one of amplitude, frequency and phase of the light is modulated. The modulated light can be visible light, infrared light or ultraviolet light.

In the fingerprint identification display device provided by at least one embodiment of the present disclosure, there is a difference in a refractive index between the display surface A of the display device and the interface of the external environment. In general, the refractive index of the external environment is about 1, and the display surface A of the display device is generally a glass medium with a refractive index greater than 1.5, in this way, a full reflection is occurred in a case that the display surface A of the display device satisfies the condition of the full reflection angle, and the modulated light is transmitted in the light guide plate 200. In a case that a finger of the user is in contact with the display surface A of the display device, the refractive index difference of the display surface A at the ridge B of the finger is reduced, in general, a finger is considered to be equivalent to a rubber material with a refractive index of about 1.5, which prevents the modulated light from being totally reflected at the ridge B of the finger, thus the modulated light is reflected to the photosensitive induction unit 400 below; a valley C of the fingerprint is not in contact with the display surface A, so that the refractive index difference of the display surface A is not changed, and the total reflection transmission of the modulated light will not be affected. The photosensitive induction unit 400 disposed below will not receive the modulated light. In this way, it is possible to detect a fingerprint based on the photosensitive effect through the photosensitive induction unit 400, and the photosensitive induction unit 400 is not easy to interfere with the other components inside the display device. In addition, the receiving of the modulated light by the photosensitive induction unit 400 is not easily affected by the distance between the photosensitive induction unit 400 and the display surface A of the display device, that is to say, it is possible to design the distance between the finger and the photosensitive induction unit 400 to be larger, so as to achieve a high quality fingerprint detection.

For example, in the fingerprint identification display device provided by at least one embodiment of the present disclosure, the light emitting component 300 emits modulated light alternated between bright and dark light and with a constant frequency in a mode of loading a constant frequency signal. The modulated light is distinguished from the environmental light and the display light emitted by the display panel 100, so as to avoid interference from the environmental light, the display light, temperature, and parasitic capacitance on the photosensitive induction unit 400 in a case that it is used for detecting fingerprint.

For example, in the fingerprint identification display device provided by at least one embodiment of the present disclosure, the light emitting component 300 is an OLED light source or a LED light source for emitting modulated infrared light or modulated visible light. For example, the light emitting component 300 is a laser light source. In general, the light emitting component 300 is arranged at the edge position of the light guide plate 200 to ensure that the influence on the normal display region is minimized. Moreover, in order to make the modulated light transmitted inside the light guide plate 200 cover the whole surface of the light guide plate 200 as far as possible, the light emitting components 300 are arranged at two sides of the light guide plate 200 opposite to each other, or the light emitting components 300 are arranged at four sides of the light guide plate 200, which is not limited herein.

For example, in a case that an OLED light source or a LED light source is used as the light emitting component 300, the OLED light source or the LED light source will emit light in all directions, in which, the light that does not meet the total reflection condition will not affect the detection of fingerprints. For example, the light emitted upwards or downwards and the light parallel to the light guide plate 200 will emit out of the light guide plate 200. The light emitted upwards slantingly but does not meet the total reflection condition is partially emitted out of the light guide plate 200 and the other portion of the light is reflected, and the reflected light is consumed or ejected after several times of reflection. Only an incidence angle of the light that is greater than a total reflection angle, that is, the light satisfying the total reflection condition is fully reflected in the light guide plate 200 and transmitted in the light guide plate 200.

Figure 2:
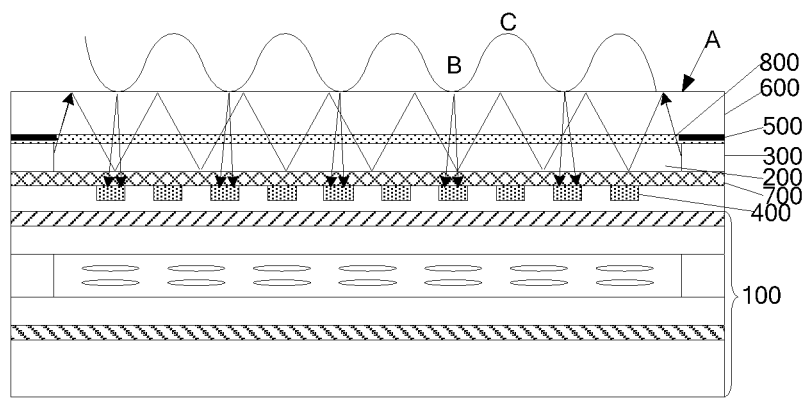
FIG. 2 is a schematic diagram of another structure of a fingerprint identification display device provided by an embodiment of the present disclosure.
Figure 3:
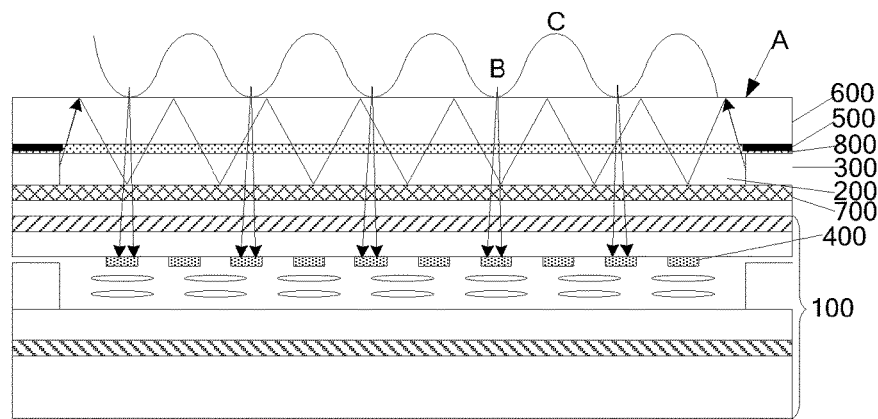
FIG. 3 is a schematic diagram of still another structure of a fingerprint identification display device provided by an embodiment of the present disclosure.

For example, the region of the light guide plate 200 close to the light emitting component 300 cannot be used for detecting fingerprints due to the existence of the emission light and the uneven intensity of light. Based on this, in order to avoid the region of the light guide plate 200 close to the light emitting component 300 which is not used for detecting fingerprints affecting the detection of fingerprints, at the same time, in order to avoid the light emitted by the light emitting component 300 affecting the display light of the display device, and thus affecting the display quality of the display screen, for example, as illustrated in FIG. 1, the fingerprint identification display device provided by the embodiment of the present disclosure further comprises: a blocking component 500 arranged on the light emitting component 300, that is, the blocking component 500 is disposed on one side of the display surface A of the light emitting component 300 close to the display device, and the positive projection of the blocking component 500 on the display panel 100 covers at least a portion of a positive projection of the light emitting component 300. For example, the positive projection of the blocking component 500 on the display panel 100 covers a whole positive projection of the light emitting component 300. For example, as illustrated in FIG. 2 and FIG. 3, generally, an area of the blocking component 500 is greater than an area of the light emitting component 300, so as to block the light emitted from the non total reflection transmitted by the light emitting component 300. For example, the functions of the blocking component 500 are realized by a black matrix material (BM).

For example, in the fingerprint identification display device provided by at least one embodiment of the present disclosure, as illustrated in FIG. 1, the light guide plate 200 is a protective cover plate arranged above the display panel 100, that is, a surface of the light guide plate 200 away from the display panel 100 is the display surface A of the display device. The protective cover plate has the function of protecting the light emitting surface of the display panel 100, thus the whole display panel 100 is covered by the protective cover plate. In order to allow the modulated light emitted from the light emitting component 300 to be transmitted in a full reflection mode in the light guide plate 200, a groove structure needs to be arranged at its frame facing a side of the display panel 100, so that the light emitting component 300 is placed in the groove structure. For example, the light emitting component 300 is embedded in the groove structure. The structural design needs to chamfer on the protective cover plate, and the blocking component 500 is provided in the grooves, which increases the complexity of the manufacturing process.

For example, in the fingerprint identification display device provided by at least one embodiment of the present disclosure, as illustrated in FIG. 2 and FIG. 3, the light guide plate 200 may also be disposed between the display panel 100 and the protective cover plate 600 disposed above the display panel 100 independently. The light emitting component 300 is disposed at at least two opposite sides of the light guide plate 200. For example, a length of the guide plate 200 is small, and spaces are left on two sides of the guide plate 200 to place the LEDs on the two sides of the light guide plate 200. Besides, a transparent optical adhesive (OCA) 800 with a refractive index of 1.5 is applied between the protective cover plate 600 and the light guide plate 200, so that the occurrence of total reflection is not be affected. For example, a blocking component 500 is formed at a position corresponding to the light emitting component 300 in the optical adhesive 800, and the manufacturing process is simpler than the process having a groove structure formed described above. However, in the structural design, as the surface of the protective cover plate 600 above the guide plate 200 away from the light guide plate 200 is the display surface A of the display device, the modulated light needs to be transmitted in a total reflection mode in the light guide plate 200 and the protective cover plate 600, which increases the distance between the finger and the photosensitive unit 400, and it is harmful for ensuring the accuracy of the detection of the fingerprints.

Figure 4:
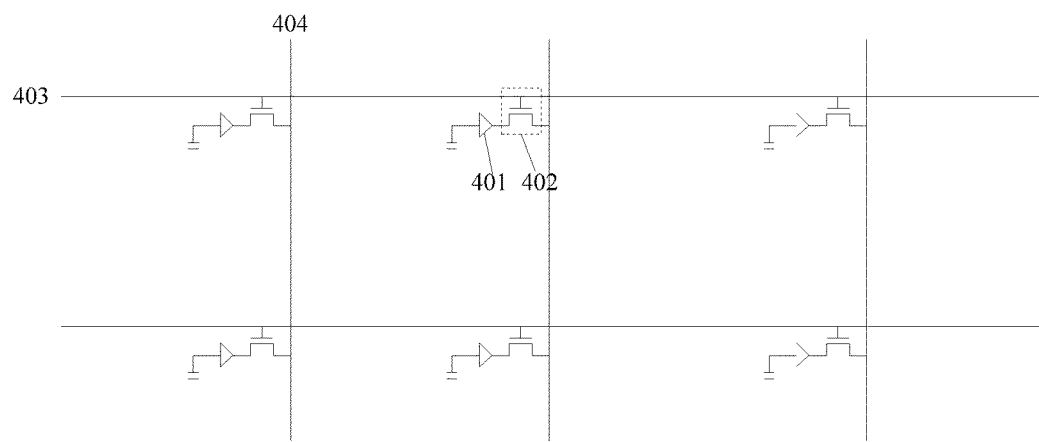
FIG. 4 is a schematic diagram of a structure of a photosensitive induction unit in a fingerprint recognition display device provided by an embodiment of the present disclosure.

For example, in the fingerprint identification display device provided by at least one embodiment of the present disclosure, as illustrated in FIG. 4, the photosensitive induction unit 400 further comprises: a photosensitive diode 401 which is configured to sense the modulated light reflected by a ridge B of a fingerprint and a control switching transistor 402 which is configured to control the photosensitive diode 401 to convert the modulated light into a potential and output the potential. For example, the fingerprint identification display device further comprise identification scanning lines 403 which are configured to load identification scanning signal to a corresponding control switching transistor 402, and recognition output lines 404 which are configured to load negative bias to the photosensitive diode 401 by the control switching transistor 402, or configured to read electrical signals output by the photosensitive diode 401. For example, each of the identification scanning lines 403 corresponds to each row of the photosensitive induction units 400 in a one-to-one manner, each of the recognition output lines 404 corresponds to each column of the photosensitive induction units 400 in a one-to-one manner; or each of the identification scanning lines 403 corresponds to each column of the photosensitive induction units 400 in a one-to-one manner, each of the recognition output lines 404 corresponds to each row of the photosensitive induction units 400 in a one-to-one manner.

For example, in the fingerprint identification display device provided by at least one embodiment of the present disclosure, in order to facilitate the identification scanning lines 403 to control the state of the control switching transistor 402, and facilitate the control switching transistor 402 to control the output signal of the photosensitive diode 401, as illustrated in FIG. 4, the gate electrode of each control switching transistor 402 is connected with the corresponding identification scanning line 403, the source electrode is connected with one end of the photosensitive diode 401, and the drain electrode is connected with the corresponding identification output line 404. For example, in order to ensure that the photosensitive diode 401 is able to carry out optoelectronic conversion, the other end of each photosensitive diode 401 is generally connected with a fixed potential. In this way, in a case that the identification scanning line 403 is loaded with a scanning signal, the control switching transistor 402 is in a conduction state, the identification output line 404 is connected to an end of the photosensitive diode 401, and a negative bias is loaded on the end of the photosensitive diode 401 by the identification output line 404 or the recognition output lines 404 are configured to read the electrical signals output by the photosensitive diode 401.

For example, as illustrated in FIG. 3, each photosensitive induction units 400, each identification scan lines 403, and each identification output lines 404 are disposed in the display panel, for example, they are arranged at the inner surface of the opposite substrate.

For example, in order to make the fingerprint recognition not affect the normal display of the display device, in the fingerprint identification display device provided by at least one embodiment of the present disclosure, each photosensitive induction units 400, each identification scan lines 403, and each identification output lines 404 are generally disposed in the region covered by the black matrix in the display panel 100, that is, each photosensitive induction units 400, each identification scan lines 403, and each identification output lines 404 are disposed at the gaps between the pixels.

For example, in the fingerprint identification display device provided by at least one embodiment of the present disclosure, the specific positions of the photosensitive induction units 400 at the bottom of the light guide plate 200 is not limited, for example, as illustrated in FIG. 1 and FIG. 2, each photosensitive induction units 400, each identification scan lines 403, and each identification output lines 404 are disposed on the surface of the light guide plate 200 close to the display panel 100, that is, the photosensitive induction units 400 are disposed on the lower surface of the light guide plate 200.

It should be noted that, the farther the photosensitive induction units 400 away from the display surface A is, the farther the photosensitive induction units 400 is away from the finger, which is harmful to ensure the accuracy of the detection of the fingerprints. The photosensitive induction units 400 are arranged on a surface not in directly contact with the light guide plate 200, the problem of breaking the full reflection transmission at the contact interface is avoided in a case that a refractive index difference at the contact interface between the photosensitive induction units 400 and the light guide plate 200 is less than a refractive index difference of the contact interface between the photosensitive induction units 400 and the other structures, and further the problem of misjudgments of the detecting fingerprints is avoided.

For example, in the fingerprint identification display device provided by at least one embodiment of the present disclosure, as illustrated in FIG. 1 to FIG. 3, the fingerprint identification display device further comprises a transparent reflection film 700 which is disposed on the surface of the light guide plate 200 close to the display panel 100 and arranged between the light guide plate 200 and each of the photosensitive induction units 400. For example, a refractive index of the transparent reflection film 700 is smaller than a refractive index of the light guide plate 200. In general, the refractive index of the transparent reflection layer 700 is less than 1.5. In this way, it is guaranteed that the modulated light is fully reflected at the interface of the light guide plate 200 facing the photosensitive induction units 400. For example, the transparent reflection film 700 is OCA.

For example, in the fingerprint identification display device provided by at least one embodiment of the present disclosure, the transparent reflection film 700 is made of inorganic material, in this way, it ensures that the transparent reflection film 700 is capable of withstanding the high temperature in the process of preparing the photosensitive induction units 400.

For example, the fingerprint identification display device provided by the embodiments of the present disclosure may be: a mobile phone, a tablet computer, a television, a display, a notebook computer, a digital picture frame, a navigation system and any other product or component having a display function.

The fingerprint identification display device provided by at least one embodiment of the present disclosure has at least one beneficial effects described below:

(1) In the fingerprint identification display device provided by at least one embodiment of the present disclosure, an efficient detection of fingerprint is achieved based on a photosensitive effect and a total reflection condition of light in medium.

(2) In the fingerprint identification display device provided by at least one embodiment of the present disclosure, the photosensitive induction unit is not easy to interfere with other components in the display device.

(3) In the fingerprint identification display device provided by at least one embodiment of the present disclosure, the receiving of the modulated light by a photosensitive induction unit is not easily affected by the distance between the photosensitive induction unit and the display surface of the display device.

There are several points that need to be explained:

(1) The drawings of the embodiment of the disclosure only involves the structure relates to the structure of the embodiments of the disclosure, and other structures can refer to a common design.

(2) For the sake of clarity, in the drawings of each embodiment of the disclosure, the thickness of a layer or an area is enlarged. It can be understood, when an element, such as a layer, a film, an area or a substrate, is called as "above" or "below" another element, the element can be "directly" "above" or "below" another element, or an intermediate element is existed.

(3) In the case of non conflict, the embodiment of the disclosure and the characteristics of the embodiment can be combined with each other.

What are described above is related to the illustrative embodiments of the disclosure only and not limitative to the scope of the disclosure. The scopes of the disclosure are defined by the accompanying claims.

The application claims priority of Chinese Patent Application No. 201610626184.1, filed on Aug. 2, 2016, the disclosure of which is incorporated herein by reference in its entirety as part of the present application.

What is claimed is:

1. A fingerprint identification display device, comprising:
a display panel;
a light guide plate arranged on a light emitting surface of the display panel;
a light emitting component configured to emit modulated light; and
a plurality of photosensitive induction units arranged in an array and arranged below the light guide plate, wherein the modulated light is transmitted between the light guide plate and the display panel in a total reflection mode.

2. The fingerprint identification display device according to claim 1, wherein each of the photosensitive induction unit comprises a photosensitive diode and a control switching transistor, the photosensitive diode is configured to sense the modulated light reflected by a ridge of a fingerprint, and the control switching transistor is configured to control the photosensitive diode to convert the modulated light into a potential and output the potential.

3. The fingerprint identification display device according to claim 2, further comprising: identification scanning lines and recognition output lines, wherein the identification scanning lines are configured to load identification scanning signals to the control switching transistor, and the recognition output lines are configured to load a negative bias to the photosensitive diode by the control switching transistor, or the recognition output lines are configured to read electrical signals output by the photosensitive diode.

4. The fingerprint identification display device according to claim 3, wherein each of the identification scanning lines corresponds to each row of the photosensitive induction units in a one-to-one manner, each of the recognition output lines corresponds to each column of the photosensitive induction units in a one-to-one manner; or
each of the identification scanning lines corresponds to each column of the photosensitive induction units in a one-to-one manner, each of the recognition output lines corresponds to each row of the photosensitive induction units in a one-to-one manner.

5. The fingerprint identification display device according to claim 1, wherein each of the photosensitive induction units, each of the identification scanning lines and each of the recognition output lines are arranged in the display panel.

6. The fingerprint identification display device according to claim 5, wherein each of the photosensitive induction units, each of the identification scanning lines and each of the recognition output lines are arranged in a region covered by a black matrix in the display panel.

7. The fingerprint identification display device according to claim 1, wherein each of the photosensitive induction units, each of the identification scanning lines and each of the recognition output lines are arranged on a surface of the light guide plate close to the display panel.

8. The fingerprint identification display device according to claim 7, further comprising, a transparent reflection film, wherein the transparent reflection film is disposed on the surface of the light guide plate close to the display panel and arranged between the light guide plate and each of the photosensitive induction units, and a refractive index of the transparent reflection film is smaller than a refractive index of the light guide plate.

9. The fingerprint identification display device according to claim 8, wherein the transparent reflection film is made of inorganic material.

10. The fingerprint identification display device according to claim 1, wherein the light guide plate is a protective cover plate which is arranged above the display panel.

11. The fingerprint identification display device according to claim 10, wherein the protective cover plate has a groove structure at a frame facing a side of the display panel, and the light emitting component is in the groove structure.

12. The fingerprint identification display device according to claim 1, further comprising a protective cover plate arranged on the display panel, wherein the light guide plate is arranged between the display panel and the protective cover plate.

13. The fingerprint identification display device according to claim 12, wherein the light emitting component is arranged at at least two sides of the light guide plate opposite to each other.

14. The fingerprint identification display device according to claim 11, further comprising a blocking component arranged on the light emitting component, wherein a positive projection of the blocking component on the display panel covers at least a portion of a positive projection of the light emitting component.

15. The fingerprint identification display device according to claim 14, wherein the positive projection of the blocking component on the display panel covers a whole positive projection of the light emitting component.

16. The fingerprint identification display device according to claim 1, wherein the light emitting component is an OLED light source or a LED light source for emitting modulated infrared light or modulated visible light.

17. The fingerprint identification display device according to claim 2, wherein each of the photosensitive induction units, each of the identification scanning lines and each of the recognition output lines are arranged in the display panel.

18. The fingerprint identification display device according to claim 2, wherein each of the photosensitive induction units, each of the identification scanning lines and each of the recognition output lines are arranged on a surface of the light guide plate close to the display panel.

19. The fingerprint identification display device according to claim 2, wherein the light guide plate is a protective cover plate which is arranged above the display panel.

20. The fingerprint identification display device according to claim 13, further comprising a blocking component arranged on the light emitting component, wherein a positive projection of the blocking component on the display panel covers at least a portion of a positive projection of the light emitting component.

* * * * *